United States Patent
Xie et al.

(10) Patent No.: US 10,740,636 B2
(45) Date of Patent: Aug. 11, 2020

(54) METHOD, SYSTEM AND TERMINAL FOR IDENTITY AUTHENTICATION, AND COMPUTER READABLE STORAGE MEDIUM

(71) Applicant: Baidu Online Network Technology (Beijing) Co., Ltd, Beijing (CN)

(72) Inventors: Wenbin Xie, Beijing (CN); Weiqing He, Beijing (CN); Fanping Liu, Beijing (CN); Xiangli Chen, Beijing (CN)

(73) Assignee: Baidu Online Nework Technology (Beijing) Co., Ltd., Beijing (CN)

( * ) Notice: Subject to any disclaimer, the term of this patent is extended or adjusted under 35 U.S.C. 154(b) by 81 days.

(21) Appl. No.: 16/153,021

(22) Filed: Oct. 5, 2018

(65) Prior Publication Data
US 2019/0279010 A1   Sep. 12, 2019

(30) Foreign Application Priority Data
Mar. 9, 2018  (CN) .......................... 2018 1 0193228

(51) Int. Cl.
*G06K 9/00* (2006.01)

(52) U.S. Cl.
CPC ..... *G06K 9/00892* (2013.01); *G06K 9/00288* (2013.01); *G06K 9/00369* (2013.01)

(58) Field of Classification Search
CPC ........... G06K 9/00369; G06K 9/00892; G06K 9/00288
See application file for complete search history.

(56) References Cited

U.S. PATENT DOCUMENTS 10,552,666 B2 *   2/2020   Craig .................. G06T 17/20
2006/0274070 A1 *   12/2006   Herman .................. G06T 13/40
                                                            345/474
(Continued)

FOREIGN PATENT DOCUMENTS

CN    105184280 A    12/2015
CN    105825176 A    8/2016
(Continued)

OTHER PUBLICATIONS

Xin Geng et al., Context-aware fusion: A case study on fusion of gait and face for human identification in video, 2010, Pattern Recognition, vol. 43, p. 3660-3673. (Year: 2010).*

(Continued)

*Primary Examiner* — Brenda C Bernardi
(74) *Attorney, Agent, or Firm* — Akerman LLP

(57) ABSTRACT

A method, a system and a terminal for identity authentication, and a computer readable storage medium are provided. The method for identity authentication includes: acquiring a facial image of a person to be authenticated, and determining from the facial image facial feature information of the person to be authenticated; determining a suspected object using a face authentication platform according to the facial feature information of the person to be authenticated; acquiring a human body image of the person to be authenticated, and determining from the human body image a plurality of skeleton key points of the person to be authenticated; converting the skeleton key points into feature data; and recognizing an identity of the person to be authenticated according to the feature data of the person to be authenticated and information of the suspected object.

15 Claims, 3 Drawing Sheets

(56) References Cited

U.S. PATENT DOCUMENTS

| | | | | |
|---|---|---|---|---|
| 2007/0172099 A1* | 7/2007 | Park | ............ | G06K 9/00281 |
| | | | | 382/118 |
| 2015/0193686 A1* | 7/2015 | Chakravarty | ............ | G01J 5/00 |
| | | | | 706/48 |
| 2015/0199890 A1* | 7/2015 | Hewett | ............ | G08B 13/2451 |
| | | | | 340/572.1 |
| 2016/0063335 A1* | 3/2016 | Wang | ............ | G06K 9/00348 |
| | | | | 382/115 |
| 2016/0189149 A1* | 6/2016 | MacLaurin | ............ | G06Q 20/40145 |
| | | | | 705/44 |
| 2018/0349684 A1* | 12/2018 | Bapat | ............ | G08B 13/19645 |

FOREIGN PATENT DOCUMENTS

| | | | | |
|---|---|---|---|---|
| CN | 106327495 A | * | 1/2017 | |
| CN | 106327495 A | | 1/2017 | |
| CN | 106650699 A | | 5/2017 | |
| CN | 106778546 A | * | 5/2017 | |
| CN | 106778546 A | | 5/2017 | |
| CN | 106778556 A | * | 5/2017 | |
| CN | 106778556 A | | 5/2017 | |
| CN | 106780864 A | | 5/2017 | |
| CN | 107133608 A | | 9/2017 | |
| CN | 107767419 A | * | 3/2018 | |
| CN | 107767419 A | | 3/2018 | |
| WO | 00016247 A1 | | 3/2000 | |

OTHER PUBLICATIONS

First Office Action issued in connection with corresponding Chinese Application No. 201810193228.5, dated Nov. 22, 2019.

Chinese Search Report issued in connection with corresponding Chinese Application No. 201810193228.5, dated Nov. 22, 2019.

* cited by examiner

METHOD, SYSTEM AND TERMINAL FOR IDENTITY AUTHENTICATION, AND COMPUTER READABLE STORAGE MEDIUM

CROSS-REFERENCE TO RELATED APPLICATIONS

This application claims priority to Chinese Patent Application No. 201810193228.5, filed on Mar. 9, 2018, which is hereby incorporated by reference in its entirety.

FIELD OF THE DISCLOSURE

The present disclosure relates to the technical field of image processing and recognition, and in particular, to a method, a system and a terminal for multi-factor identity authentication based on face and physique, and a computer readable storage medium.

BACKGROUND OF THE DISCLOSURE

In the existing technology, when a person passes through a device such as a gate or an entrance guard, an identity authentication needs to be performed on the person. Usually, the authentication is performed only in a single manner, such as fingerprint recognition or face recognition. However, with the development of technology, a single manner of identity authentication is not safe or reliable enough, and the system is vulnerable to an attack, so that the identity of the person to be authenticated cannot be accurately determined or may be misrecognized. On the other hand, a device for identity authentication is greatly affected by external environmental factors. When the resolution is low, the ambient light is poor, or the makeup changes, the identity cannot be accurately recognized, which may cause a deviation in the final authentication result, resulting in misrecognition or inability to recognize, and greatly reducing recognition efficiency and accuracy.

The above information disclosed in the background is only for enhancing an understanding of the background of the present disclosure. Therefore, it may contain information that does not constitute the existing technology known to those skilled in the art.

SUMMARY OF THE DISCLOSURE

A method, a system and a terminal for identity authentication, and a computer readable storage medium are provided according to embodiments of the present disclosure, so as to solve one or more technical problems in the existing technology.

In a first aspect, a method for identity authentication is provided according to an embodiment of the present disclosure. The method includes:

acquiring a facial image of a person to be authenticated, and determining from the facial image facial feature information of the person to be authenticated;

determining a suspected object using a face authentication platform according to the facial feature information of the person to be authenticated;

acquiring a human body image of the person to be authenticated, and determining from the human body image a plurality of skeleton key points of the person to be authenticated;

converting the skeleton key points into feature data; and recognizing an identity of the person to be authenticated according to the feature data of the person to be authenticated and information of the suspected object.

In combination with the first aspect, in a first embodiment of the first aspect of the present disclosure, said determining a suspected object using a face authentication platform: determining one suspected person, and said recognizing an identity of the person to be authenticated according to the feature data of the person to be authenticated and information of the suspected object includes:

combining the feature data to form first physique feature information characterizing the person to be authenticated;

obtaining second physique feature information of the suspected person;

processing the first physique feature information and the second physique feature information using a first physique feature model, to obtain a processing result; and determining a probability that the identity of the person to be authenticated is the suspected person, according to the processing result.

In combination with the first embodiment of the first aspect, in a second embodiment of the first aspect of the present disclosure, said determining a suspected object using a face authentication platform includes:

determining a plurality of suspected persons using the face authentication platform according to the facial feature information of the person to be authenticated; and scoring the plurality of suspected persons, to obtain face scores of the suspected persons.

In combination with the second embodiment of the first aspect, in a third embodiment of the first aspect of the present disclosure, said recognizing an identity of the person to be authenticated according to the feature data of the person to be authenticated and information of the suspected object includes:

combining the feature data to form first physique feature information characterizing the person to be authenticated;

processing the first physique feature information using a second physique feature model, to determine a plurality of candidate persons, and scoring the plurality of candidate persons, to obtain physique scores of the candidate persons;

performing a calculation according to the physique scores of the candidate persons and the face scores of the suspected persons; and determining the identity of the person to be authenticated according to a result of the calculation.

In combination with the third embodiment of the first aspect, in a fourth embodiment of the first aspect of the present disclosure, said performing a calculation according to the physique scores of the candidate persons and the face scores of the suspected persons includes:

determining persons that are contained in both the candidate persons and the suspected persons as objects;

performing weighted-summation on the physique score and the face score of each of the objects, to obtain final scores of the objects; and selecting an object with the highest final score as the identity of the person to be authenticated.

In combination with the first aspect, in a fifth embodiment of the first aspect of the present disclosure, said determining a plurality of skeleton key points of the person to be authenticated includes:

extracting the plurality of skeleton key points of the person to be authenticated from the human body image of the person to be authenticated, based on a skeleton recognition model constructed by a convolutional neural network.

In combination with the first aspect, in a sixth embodiment of the first aspect of the present disclosure, before converting the skeleton key points into feature data, the method further includes:

converting the skeleton key points determined in a non-standard posture of the person to be authenticated, into standard skeleton key points in a standard posture of the person to be authenticated.

In combination with the first aspect, in a seventh embodiment of the first aspect of the present disclosure, the facial image and the human body image of the person to be authenticated are acquired by at least one image acquisition device.

In a second aspect, a system for identity authentication is provided according to an embodiment of the present disclosure. The system includes:

a facial recognition module configured to acquire a facial image of a person to be authenticated, and determine from the facial image facial feature information of the person to be authenticated;

a matching module configured to determine a suspected object using a face authentication platform according to the facial feature information of the person to be authenticated;

a human body recognition module configured to acquire a human body image of the person to be authenticated, and determine from the human body image a plurality of skeleton key points of the person to be authenticated;

a conversion module configured to convert the skeleton key points into feature data; and an authentication module configured to recognize an identity of the person to be authenticated according to the feature data of the person to be authenticated and information of the suspected object.

In a possible design, the matching module is configured to determine one suspected person, and the authentication module includes:

a first physique feature sub-module configured to combine the feature data to form first physique feature information characterizing the person to be authenticated;

a second physique feature sub-module configured to obtain second physique feature information of the suspected person;

a first processing sub-module configured to process the first physique feature information and the second physique feature information using a first physique feature model, to obtain a processing result; and an authentication sub-module configured to determine a probability that the identity of the person to be authenticated is the suspected person, according to the processing result.

In a possible design, the matching module includes:

a second processing sub-module configured to determine a plurality of suspected persons using the face authentication platform according to the facial feature information of the person to be authenticated, and score the plurality of suspected persons, to obtain face scores of the suspected persons.

In a possible design, the authentication module includes:

a first physique feature sub-module configured to combine the feature data to form first physique feature information characterizing the person to be authenticated;

a third processing sub-module configured to process the first physique feature information using a second physique feature model, to determine a plurality of candidate persons, and score the plurality of candidate persons, to obtain physique scores of the candidate persons;

a calculation sub-module configured to perform a calculation according to the physique scores of the candidate persons and the face scores of the suspected persons; and an authentication sub-module configured to determine the identity of the person to be authenticated according to a result of the calculation.

In a third aspect, a terminal for identity authentication is provided according to an embodiment of the present disclosure. The terminal includes:

one or more processors;

a storage device configured to store one or more programs; and a camera configured to acquire an image;

the one or more programs, when executed by the one or more processors, enable the one or more processors to implement any of the methods included in the first aspect.

In a fourth aspect, a computer readable storage medium, in which a computer program is stored, is provided according to an embodiment of the present disclosure, wherein the computer program, when executed by a processor, implements any of the methods included in the first aspect.

One of the above technical solutions has the following advantages or advantageous effects: 1. by combining the two technologies of face authentication and physique authentication, the user is provided with multi-factor identity authentication with a higher security level, which can effectively resist living body attacks in face recognition; the physique authentication can block an attack to a face recognition system which is performed by an attacker with photos or videos, thus effectively compensating for the deficiencies of single-factor authentication and improving the accuracy of authentication; 2. physique authentication is a non-perceptual identity authentication technology based on skeleton key points, which can acquire skeleton information of the human body at an intermediate or long distance by using an ordinary image acquisition device, and has a strong robustness to the change of face and ambient light; it is less dependent on the environment and the person himself/herself, and can be a powerful supplement to face recognition.

The above summary is provided only for illustration, and is not intended to limit the disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION OF THE EMBODIMENT(S) OF THE DISCLOSURE

Hereinafter, only some exemplary embodiments are simply described. As can be recognized by those skilled in the art, the described embodiments may be modified in various ways without departing from the spirit or scope of the present disclosure. Accordingly, the drawings and the description should be considered as illustrative in nature instead of being restrictive.

First Embodiment

Figure 1:
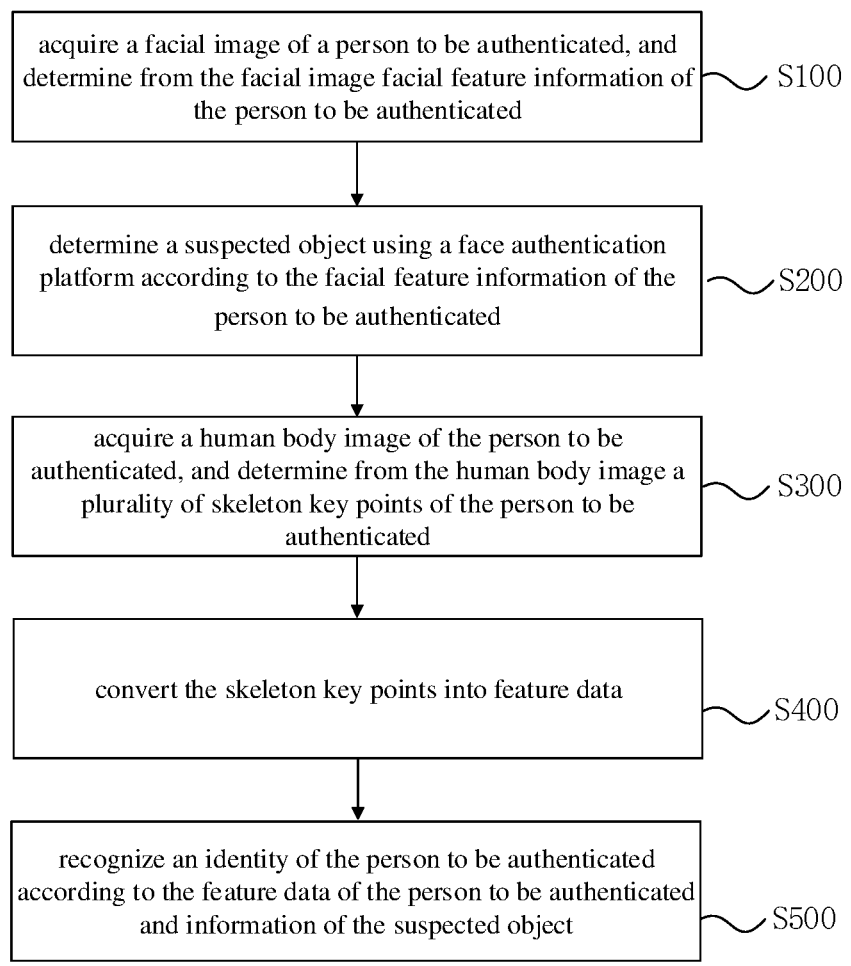
FIG. 1 is a schematic flowchart of a method for identity authentication according to an embodiment of the present disclosure.

A method for identity authentication is provided according to this embodiment of the present disclosure. As shown in FIG. 1, the method mainly includes steps S100 to S500.

In step S100, a facial image of a person to be authenticated is acquired, and facial feature information of the person to be authenticated is determined from the facial image of the person to be authenticated.

The facial image of the person to be authenticated can be acquired via a camera or another existing image acquisition device. In order to improve the accuracy of the acquired facial image, a high-definition image acquisition device is preferably used, and the high-definition image acquisition device can also be applied to intermediate- and long-distance facial image acquisition. When the person to be authenticated is at a short distance, an ordinary camera can also be applied to facial image acquisition.

In step S200, a suspected object is determined using a face authentication platform according to the facial feature information of the person to be authenticated.

In an embodiment, the face authentication platform may be any authentication system in the existing technology, and the authentication method may also be any method in the existing technology. For example, a face feature model may be used for scoring, or a database may also be used for comparison of face feature information. The suspected object determined by the face authentication platform may be one person or multiple persons. When the suspected object is one person, the person is a suspected person with the highest face score, determined by the face authentication platform according to the facial feature information of the person to be authenticated. When the suspected object is multiple persons, the multiple persons are the first N suspected persons whose face scores are each greater than a threshold, determined by the face authentication platform according to the facial feature information of the person to be authenticated, where N and the threshold are both preset values.

In step S300, a human body image of the person to be authenticated is acquired, and a plurality of skeleton key points of the person to be authenticated are determined from the human body image.

The human body image of the person to be authenticated can be acquired via a camera or another existing image acquisition device. Since the acquisition of the human body image of the person is less dependent on the environment and the person himself/herself, the human body image may be acquired with an image acquisition device with a low resolution.

In an embodiment, the facial image and the human body image of the person to be authenticated can be acquired by the same image acquisition device or different image acquisition devices respectively.

In step S400, the skeleton key points are converted into feature data.

In step S500, an identity of the person to be authenticated is recognized according to the feature data of the person to be authenticated and information of the suspected object.

The feature data of the person to be authenticated is combined with the information of the suspected object to obtain a score. In a case where the score does not exceed a score threshold, it is determined that the person to be authenticated is not a person with a legitimate identity, and the person to be authenticated cannot pass through a device such as a gate or an entrance guard. In a case where the score exceeds the threshold, the person to be authenticated is determined as a person with a legitimate identity, and the person to be authenticated can pass through the device such as the gate or the entrance guard.

On the basis of the first embodiment, after being acquired, the facial image and/or the human body image may be pre-processed to improve the accuracy of a subsequent extraction of facial feature information and skeleton key points, so that subsequent operations are performed after the quality of the facial image and the human body image is improved.

The acquired facial image and/or human body image is preprocessed with any image processing method in the existing technology, such as light adjustment, noise reduction processing and contrast adjustment. It should be noted that, instead of being limited to the preprocessing method illustrated in the embodiment, the specific image preprocessing method may be any method in the existing technology, as long as the acquired image can be optimized with the method.

On the basis of the first embodiment, determining from the human body image a plurality of skeleton key points of the person to be authenticated includes: extracting from the human body image a plurality of skeleton key points of the person to be authenticated, based on a skeleton recognition model constructed by a convolutional neural network.

It should be noted that, the specific skeleton key points can be selected as required, as long as the selected skeleton key points can express body parts of a physique of the person to be authenticated. The number of the specifically extracted skeleton key points can also be selected as required. Physique features of the person to be authenticated can be recognized more accurately with an increase of the number of the selected skeleton key points.

In an embodiment, information of the skeleton key points may include, for example, position information of some or all of the following: right ankle, right knee, right buttock, left hip, left knee, left ankle, pelvis, chest, upper neck, top of head, right wrist, right elbow, right shoulder, left shoulder, left elbow and left wrist. It should be noted that, the skeleton key points are not limited to the points in the above example, and can be adjusted as required.

On the basis of the first embodiment, the method of the present disclosure can be at least applied to a strong security authentication scene and an efficient authentication scene.

Figure 2:
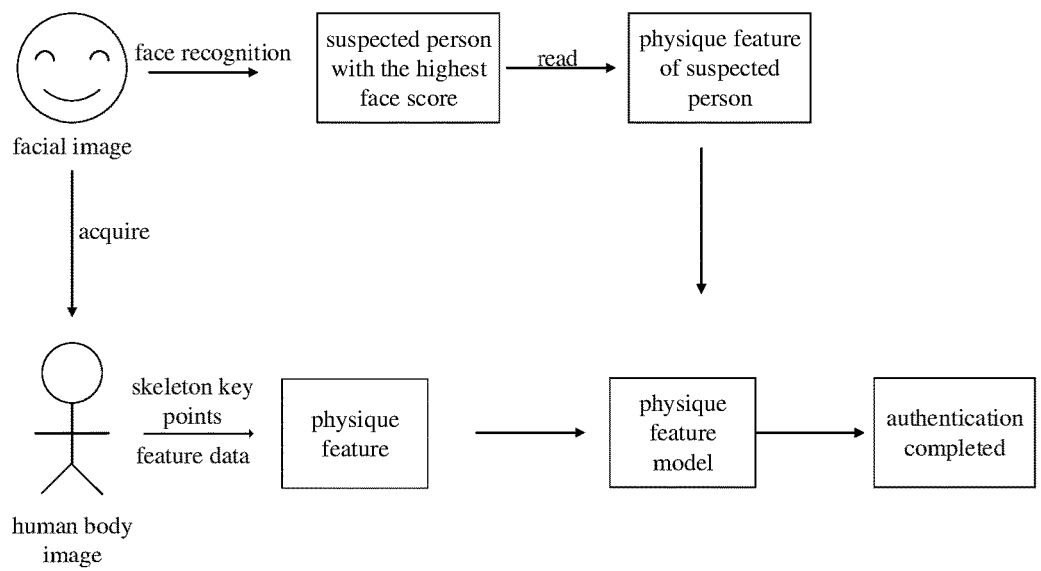
FIG. 2 is a schematic flow chart of a method for identity authentication according to an embodiment of the present disclosure.

When applied to a strong security authentication scene, a combination of facial strong-factor authentication and physical cofactor authentication is used. As shown in FIG. 2, on the basis of the first embodiment, determining a suspected object using a face authentication platform comprises: determining one suspected person, and recognizing an identity of the person to be authenticated according to the feature data of the person to be authenticated and information of the suspected object includes:

combining the feature data to form first physique feature information characterizing the person to be authenticated;

obtaining second physique feature information from the information of the suspected object;

processing the first physique feature information and the second physique feature information using a first physique feature model, to obtain a processing result; and determining a probability that the identity of the person to be authenticated is the suspected person, according to the processing result.

It should be noted that the processing process of the first physique feature model includes: comparing the first physique feature information with the second physique feature information by the first physique feature model, and scoring based on the comparison result of the first physique feature information with the second physique feature information.

The combination of facial strong-factor authentication and physical cofactor authentication can achieve more secure and reliable identity authentication, and the addition of physique authentication can effectively resist living body attacks in face recognition. The physique authentication can block an attack to a face recognition system which is performed by an attacker with a photos or a video.

Figure 3:
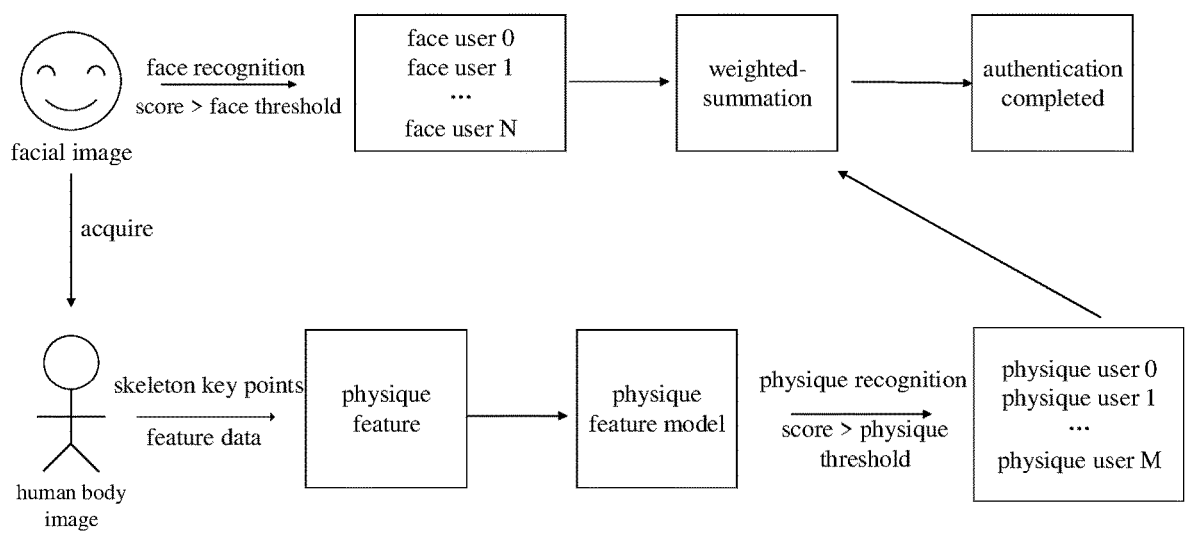
FIG. 3 is a schematic flow chart of a method for identity authentication according to another embodiment of the present disclosure.

In a case of an efficient authentication scene, the facial and physical dual-factor authentication is used. As shown in FIG. 3, on the basis of the first embodiment, determining a suspected object by a face authentication platform (the suspected object is the first N persons whose face scores are each greater than a threshold, as determined by the face authentication platform, where N is the number of persons) includes: determining, by the face authentication platform, multiple suspected persons according to the facial feature information of the person to be authenticated, and scoring the face of each of the suspected persons.

Recognizing an identity of the person to be authenticated according to the feature data of the person to be authenticated and information of the suspected object includes:

combining the feature data to form first physique feature information characterizing the person to be authenticated;

processing the first physique feature information using a second physique feature model, to determine a plurality of candidate persons, and scoring the plurality of candidate persons, to obtain physique scores of the candidate persons (the candidate persons are the first M persons whose physique scores are each greater than a threshold, where M is the number of persons);

performing a calculation according to the physique scores of the candidate persons and the face scores of the suspected persons; and determining the identity of the person to be authenticated according to a result of the calculation.

The facial and physical dual-factor authentication method enables more efficient identity authentication. When the face itself changes (makeup, hair style change) or the shooting environment is poor (environmental illumination, camera resolution), the face authentication score is low. In this situation, physical authentication is used in combination with the face authentication so as to improve the accuracy of identity authentication and reduce the rate of misrecognition.

In an embodiment, said performing a calculation according to the physique scores of the candidate persons and the face scores of the suspected persons includes:

determining persons that are included in both the candidate persons and the suspected persons as objects;

performing weighted-summation on the physique score and the face score of each of the objects, to obtain final scores of the objects; and selecting an object with the highest final score as the identity of the person to be authenticated.

In a specific embodiment, the weighted-summation formula is:

$$w_{face}*Score_{face}+w_{physique}*Score_{physique}=Score_{Final}$$

where $w_{face}$ is a preset weight of face, $w_{physique}$ is a preset weight of physique, $Score_{face}$ is a face score of a suspected person, $Score_{physique}$ is a physique score of a candidate person, and $Score_{Final}$ is a comprehensive score based on face and physique.

Based on the above formula, it should be noted that when a face-suspected person does not appear in the M physique-candidate persons, the physique score of the face-suspected person is recorded as 0. Similarly, when a physique-candidate person does not appear in the N face-suspected persons, the face score of the physique-candidate person is recorded as 0.

In the above embodiments, any one of the feature data can be understood as a sum of distances between any one of the feature points and all the skeleton key points. For example, a sum of distances from all the skeleton key points to the center of gravity of the human body is taken as one of the feature data, or, a sum of angles from all the skeleton key points to the center of gravity of the human body is taken as one of the feature data.

The feature points can be understood as arbitrary points on a human body, such as various tangible or intangible feature points including the head of the human body, the center of gravity of the human body and so on.

The number of the feature points is greater than the number of the skeleton key points. For example, if 16 skeleton key points are extracted, 512 feature points may be converted from the 16 skeleton key points. The specific number of the skeletal key points and the specific number of the feature points are adjusted based on requirements and authentication accuracy, and are not limited to those defined in this embodiment. The above parameters are merely for explanation.

Figure 4:
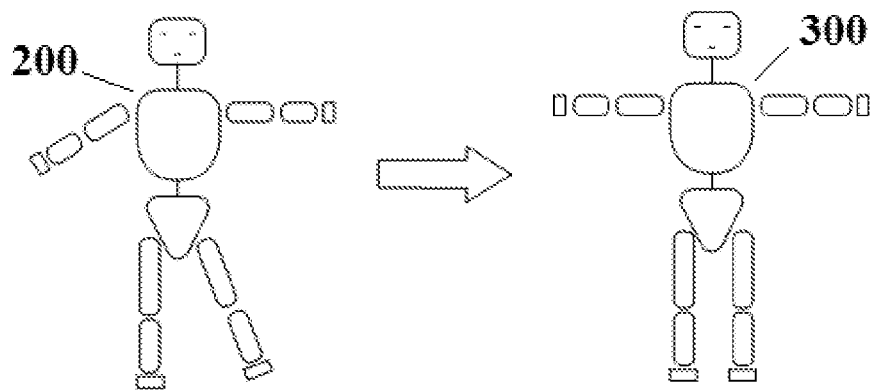
FIG. 4 is a schematic diagram showing a correction from a non-standard posture to a standard posture according to an embodiment of the present disclosure.

On the basis of the first embodiment, as shown in FIG. 4, before converting the skeleton key points into feature data, the method includes:

converting the skeleton key points determined in a non-standard posture of the person to be authenticated into standard skeleton key points in a standard posture of the person to be authenticated. The correction may be implemented with an affine transformation method. Then, the standard skeleton key points are converted into feature data.

It should be noted that, the human body image may be acquired when the person to be authenticated in a static state or in a walking state. Therefore, the acquired human body image may be a human body image under a non-standard posture when the person to be authenticated is in a dynamic posture, instead of a human body image under a standard standing posture. In order to ensure the accuracy of extraction of the skeleton key point and not to affect the acquired physique feature information subsequently, a human body image under a non-standard posture 200 needs to be corrected into a human body image under a standard posture 300, thereby achieving extraction of the skeleton key points of the human body image under the standard posture.

On the basis of the first embodiment, the method further includes a step of constructing a skeleton recognition model.

Specifically, sample skeleton key points of sample human body images are labeled, and a basic model is constructed based on the sample skeleton key points of the sample human body images. The sample skeleton key points of the sample human body images may be labeled manually. The basic model is integratedly constructed based on data of the labeled human body images, for recognizing the skeleton key points of the acquired human body image.

The basic model is trained with training samples to generate a skeleton recognition model capable of recognizing the skeleton key points. Since the initial basic model is constructed based on a few sample human body images, the capability of the basic model to recognize skeleton key points may not be adapted to all human body images. Therefore, the basic model needs to be repeatedly trained with more training samples and is updated until the basic model converges. That is, it is considered that the basic model can serve as the skeleton recognition model if the capability to recognize the skeleton key points of different human body images reaches a standard.

In a preferred embodiment, the skeleton recognition model is constructed based on a deep convolutional neural network.

On the basis of the first embodiment, the method further includes a step of constructing the physique feature model.

Specifically, the sample skeleton key points of the sample human body image are converted into sample feature data, and the physique feature model is constructed based on the sample feature data, a fully connected network structure and/or a residual network structure, wherein the sample skeleton key points are standard sample skeleton key points under the standard posture.

On the basis of the first embodiment, standard physique feature information of a person can be pre-stored by active uploading or passive acquisition.

In the active uploading, a full-body image of the person is uploaded to a system, and standard physique feature information is extracted with the skeleton recognition model and the physique feature model. The person can directly pass the authentication when passing through the identity recognition system again.

In the passive acquisition, when the person passes through devices such as the gate or the entrance guard for the first time, human body images of the person within a walking period is acquired by an image acquisition device, and standard physique feature information is extracted with the skeleton recognition model and the physique feature model. The person can directly pass the authentication when passing through the identity recognition system again.

Second Embodiment

Figure 5:
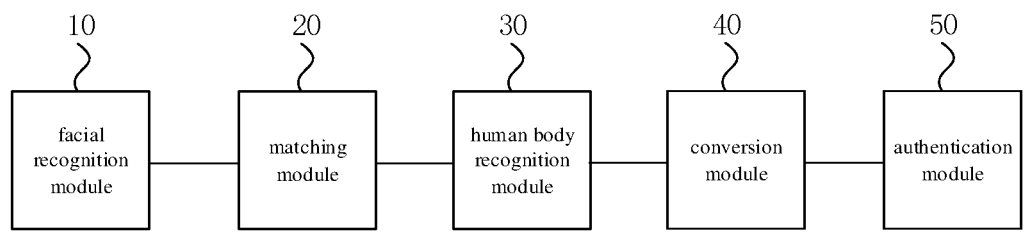
FIG. 5 is a schematic structural diagram of a system for identity authentication according to an embodiment of the present disclosure.
Figure 6:
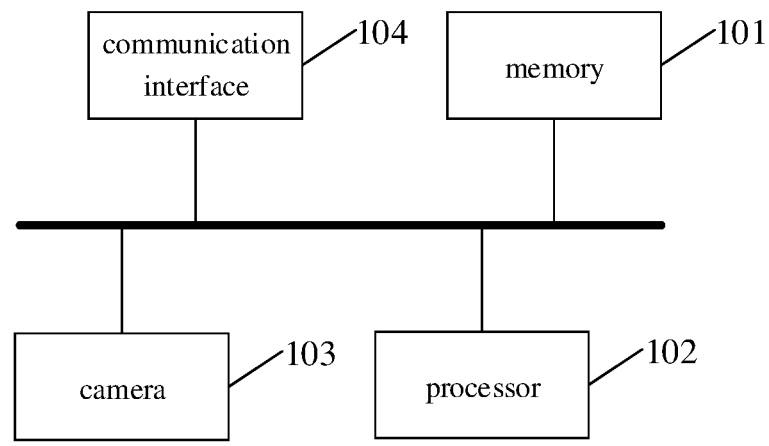
FIG. 6 is a schematic structural diagram of a terminal for identity authentication according to an embodiment of the present disclosure.

A system for identity recognition is provided according to an embodiment of the present disclosure. As shown in FIG. 5, the system includes a facial recognition module 10, a matching module 20, a human body recognition module 30, a conversion module 40 and an authentication module 50.

The facial recognition module 10 is configured to acquire a facial image of a person to be authenticated, and determine from the facial image facial feature information of the person to be authenticated.

The matching module 20 is configured to determine a suspected object using a face authentication platform according to the facial feature information of the person to be authenticated.

The human body recognition module 30 is configured to acquire a human body image of the person to be authenticated, and determine from the human body image a plurality of skeleton key points of the person to be authenticated.

The conversion module 40 is configured to convert the skeleton key points into feature data.

The authentication module 50 is configured to recognize an identity of the person to be authenticated according to the feature data of the person to be authenticated and information of the suspected object.

In a possible design, the matching module 20 is configured to determine one suspected person, and the authentication module 50 includes:

a first physique feature sub-module configured to combine the feature data to form first physique feature information characterizing the person to be authenticated;

a second physique feature sub-module configured to obtain second physique feature information of the suspected person;

a first processing sub-module configured to process the first physique feature information and the second physique feature information using a first physique feature model, to obtain a processing result; and an authentication sub-module configured to determine a probability that the identity of the person to be authenticated is the suspected person, according to the processing result.

In a possible design, the matching module 20 includes:

a second processing sub-module configured to determine a plurality of suspected persons using the face authentication platform according to the facial feature information of the person to be authenticated, and score the plurality of suspected persons, to obtain face scores of the suspected persons.

In a possible design, the authentication module 50 includes:

a first physique feature sub-module configured to combine the feature data to form first physique feature information characterizing the person to be authenticated;

a third processing sub-module configured to process the first physique feature information using a second physique feature model, to determine a plurality of candidate persons, and score the plurality of candidate persons, to obtain physique scores of the candidate persons;

a calculation sub-module configured to perform a calculation according to the physique scores of the candidate persons and the face scores of the suspected persons; and an authentication sub-module configured to determine the identity of the person to be authenticated according to a result of the calculation.

In a possible design, the conversion module 40 includes:

a correction sub-module configured to converting the skeleton key points determined in a non-standard posture of the person to be authenticated, into standard skeleton key points in a standard posture of the person to be authenticated.

Third Embodiment

A terminal for identity authentication is provided according to an embodiment of the present disclosure, the terminal includes:

a memory 101 and a processor 102, wherein a computer program that can run on the processor 102 is stored in the memory 101, the processor 102 executes the computer program to implement the method for identity authentication in the above embodiment, and the number the memory 101 and the processor 102 may each be one or more;

a camera 103 configured to capture an image; and a communication interface 104 configured to enable the memory 101 and the processor 102 to communicate with an external device.

The memory 101 may include a high-speed RAM memory, or may also include a non-volatile memory, such as at least one disk memory.

If the memory 101, the processor 102, the camera 103 and the communication interface 104 are implemented independently, the memory 101, the processor 102, the camera 103 and the communication interface 104 may be connected to each other via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus and so on. For ease of illustration, only one bold line is shown in FIG. 3 to represent the bus, but it does not mean that there is only one bus or only one type of bus.

Optionally, in a specific implementation, if the memory 101, the processor 102, the camera 103 and the communication interface 104 are integrated on one chip, then the memory 101, the processor 102, the camera 103 and the communication interface 104 can complete mutual communication through an internal interface.

Fourth Embodiment

A non-volatile computer readable storage medium is provided according to an embodiment of the present disclosure, wherein a computer program is stored on the storage medium, and the computer program, when executed by a processor, implements the method for identity authentication as described in any of the above embodiments.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowchart or described otherwise herein may be construed as representing a module, segment or portion including codes of one or more executable instructions for implementing a particular logical function or process step. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the present specification, "computer-readable medium" can be any means that can contain, store, communicate, propagate or transmit programs for use by an instruction execution system, apparatus or device or for use in conjunction with the instruction execution system, apparatus or device.

The computer-readable medium described in the embodiments of the disclosure may a computer-readable signal medium or a computer-readable storage medium or any combination of a computer-readable signal medium and a computer-readable storage medium. More specific examples (non-exhaustive list) of computer-readable storage medium at least include: an electrical connection part (an electronic device) having one or more wires, a portable computer disk cartridge (a magnetic device), a random access memory (RAM), a read only memory (ROM), an erasable programmable read-only memory (EPROM or flash memory), a fiber optic device, and a portable read-only memory (CDROM). In addition, the computer-readable storage medium may even be a paper or other suitable medium on which the program can be printed, for example, because the program is obtained electronically by optically scanning the paper or other medium, followed by editing, interpretation or, if necessary, in another suitable way of processing, and then is stored in a computer memory.

In an embodiment of the disclosure, the computer-readable signal medium may include a data signal propagating in a baseband or as a part of a carrier, in which computer-readable program codes are carried. Such propagating data signal can take a variety of forms including, but not limited to, an electromagnetic signal, optical signal, or any suitable combination of the electromagnetic signal and optical signal. The computer-readable signal medium may also be any computer-readable medium other than a computer-readable storage medium, and the computer-readable medium can send, propagate or transmit a program for use by an instruction execution system, an input method, or a device or for use in conjunction with the instruction execution system, the input method, or the device. The program codes embodied in the computer-readable medium can be transmitted by any suitable medium, including but not limited to: wireless, wire, optic cable, radio frequency (RF), etc., or any suitable combination of the foregoing.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: a discrete logic circuit having a logic gate circuit for implementing a logic function on a data signal, an application-specific integrated circuit having a suitable combined logic gate circuit, a programmable gate array (PGA), a field programmable gate array (FPGA), etc.

Those skilled in the art may understand that all or some of the steps carried in the method of the foregoing embodiments may be implemented by using a program to instruct the relevant hardware, and the program may be stored in a computer-readable storage medium. When executed, the program includes one or a combination of the steps in the method embodiments.

In addition, individual functional units in each of various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be subject to the scope of the appended claims.

What is claimed is:

1. A method for identity authentication, comprising:
   acquiring a facial image of a person to be authenticated, and determining from the facial image facial feature information of the person to be authenticated;
   determining a suspected object using a face authentication platform according to the facial feature information of the person to be authenticated;
   acquiring an overall human body image of the person to be authenticated via a camera, and determining from the overall human body image a plurality of skeleton key points of the person to be authenticated;
   determining feature data according to the skeleton key points and feature points of the person to be authenticated; and
   recognizing an identity of the person to be authenticated according to the feature data of the person to be authenticated and information of the suspected object.

2. The method according to claim 1, wherein said determining a suspected object using a face authentication platform comprises: determining one suspected person, and
   said recognizing an identity of the person to be authenticated according to the feature data of the person to be authenticated and information of the suspected object comprises:
   combining the feature data to form first physique feature information characterizing the person to be authenticated;
   obtaining second physique feature information of the suspected person;
   processing the first physique feature information and the second physique feature information using a first physique feature model, to obtain a processing result; and
   determining a probability that the identity of the person to be authenticated is the suspected person, according to the processing result.

3. The method according to claim 1, wherein said determining a suspected object using a face authentication platform comprises:
   determining a plurality of suspected persons using the face authentication platform according to the facial feature information of the person to be authenticated; and
   scoring the plurality of suspected persons, to obtain face scores of the suspected persons.

4. The method according to claim 3, wherein said recognizing an identity of the person to be authenticated according to the feature data of the person to be authenticated and information of the suspected object comprises:
   combining the feature data to form first physique feature information characterizing the person to be authenticated;
   processing the first physique feature information using a second physique feature model, to determine a plurality of candidate persons, and scoring the plurality of candidate persons, to obtain physique scores of the candidate persons;
   performing a calculation according to the physique scores of the candidate persons and the face scores of the suspected persons; and
   determining the identity of the person to be authenticated according to a result of the calculation.

5. The method according to claim 4, wherein said performing a calculation according to the physique scores of the candidate persons and the face scores of the suspected persons comprises:
   determining persons that are contained in both the candidate persons and the suspected persons as objects;
   performing weighted-summation on the physique score and the face score of each of the objects, to obtain final scores of the objects; and
   selecting an object with the highest final score as the identity of the person to be authenticated.

6. The method according to claim 1, wherein said determining a plurality of skeleton key points of the person to be authenticated comprises:
   extracting the plurality of skeleton key points of the person to be authenticated from the human body image of the person to be authenticated, based on a skeleton recognition model constructed by a convolutional neural network.

7. The method according to claim 1, wherein before converting the skeleton key points into feature data, the method further comprises:
   converting the skeleton key points determined in a non-standard posture of the person to be authenticated, into standard skeleton key points in a standard posture of the person to be authenticated.

8. The method according to claim 1, wherein the facial image and the human body image of the person to be authenticated are acquired by at least one image acquisition device.

9. The method according to claim 1, wherein the feature data comprises a sum of distances from all the skeleton key points to one of the feature points.

10. A system for identity authentication, comprising:
    one or more processors; and a storage device configured to store one or more programs, wherein the one or more programs, when executed by the one or more processors, enable the one or more processors to:

acquire a facial image of a person to be authenticated, and determine from the facial image facial feature information of the person to be authenticated;

determine a suspected object using a face authentication platform according to the facial feature information of the person to be authenticated;

acquire an overall human body image of the person to be authenticated via a camera, and determine from the overall human body image a plurality of skeleton key points of the person to be authenticated;

determine feature data according to the skeleton key points and feature points of the person to be authenticated; and recognize an identity of the person to be authenticated according to the feature data of the person to be authenticated and information of the suspected object.

11. The system according to claim 10, wherein the one or more programs, when executed by the one or more processors, enable the one or more processors further to determine one suspected person, and the one or more programs, when executed by the one or more processors, enable the one or more processors further to:

combine the feature data to form first physique feature information characterizing the person to be authenticated;

obtain second physique feature information of the suspected person;

process the first physique feature information and the second physique feature information using a first physique feature model, to obtain a processing result; and determine a probability that the identity of the person to be authenticated is the suspected person, according to the processing result.

12. The system according to claim 10, wherein the one or more programs, when executed by the one or more processors, enable the one or more processors further to:

determine a plurality of suspected persons using the face authentication platform according to the facial feature information of the person to be authenticated, and score the plurality of suspected persons, to obtain face scores of the suspected persons.

13. The system according to claim 12, wherein the one or more programs, when executed by the one or more processors, enable the one or more processors further to:

combine the feature data to form first physique feature information characterizing the person to be authenticated;

process the first physique feature information using a second physique feature model, to determine a plurality of candidate persons, and score the plurality of candidate persons, to obtain physique scores of the candidate persons;

perform a calculation according to the physique scores of the candidate persons and the face scores of the suspected persons; and determine the identity of the person to be authenticated according to a result of the calculation.

14. The system according to claim 10, wherein the feature data comprises a sum of distances from all the skeleton key points to one of the feature points.

15. A non-transitory computer readable storage medium, in which a computer program is stored, wherein the computer program, when executed by a processor, implements the method according to claim 1.

* * * * *